United States Patent [19]

Tanny

[11] Patent Number: 4,466,931

[45] Date of Patent: Aug. 21, 1984

[54] METHOD FOR MANUFACTURING MICROPOROUS MEMBRANE

[75] Inventor: Gerald B. Tanny, Rehovot, Israel

[73] Assignee: Gelman Sciences Inc., Ann Arbor, Mich.

[21] Appl. No.: 405,226

[22] Filed: Aug. 5, 1982

[51] Int. Cl.³ ............................................. B29D 27/04
[52] U.S. Cl. .................. 264/22; 204/159.15; 204/159.16; 204/159.22; 264/41; 264/49; 264/171; 264/233; 264/236; 264/331.18; 264/344; 521/63; 521/64
[58] Field of Search .............. 264/22, 49, 236, 233, 264/344, 171, 216, 331.18, 41; 204/159.22, 159.16, 159.15; 521/63, 64

[56] References Cited

U.S. PATENT DOCUMENTS

| | | | |
|---|---|---|---|
| 3,031,721 | 5/1962 | Friedlander | 264/331.18 |
| 3,256,219 | 6/1966 | Will | 521/63 |
| 3,679,783 | 7/1972 | McGarr | 521/63 |
| 3,709,805 | 1/1973 | Krauch et al. | 204/159.23 |
| 3,860,680 | 1/1975 | Warwicker et al. | 264/216 |
| 3,892,665 | 7/1975 | Steigelmann et al. | 264/41 |
| 4,001,462 | 1/1977 | Blin et al. | 204/159.22 |
| 4,039,414 | 8/1977 | McGinniss | 204/181 |
| 4,048,036 | 9/1977 | Prucnal | 204/159.23 |
| 4,075,366 | 2/1978 | Packer et al. | 427/44 |
| 4,125,503 | 11/1978 | McCarty et al. | 204/159.22 |
| 4,148,987 | 4/1979 | Winey | 526/316 |
| 4,178,221 | 12/1979 | Boutin et al. | 204/159.23 |
| 4,268,463 | 5/1981 | Aoyagi et al. | 264/22 |
| 4,306,955 | 12/1981 | Neel et al. | 204/159.22 |
| 4,360,541 | 11/1982 | Costanza et al. | 204/159.22 |
| 4,404,073 | 9/1983 | Bartissol et al. | 204/159.22 |

FOREIGN PATENT DOCUMENTS

| | | | |
|---|---|---|---|
| 49-11261 | 3/1974 | Japan | 264/22 |
| 932126 | 7/1963 | United Kingdom . | |

Primary Examiner—Jeffery R. Thurlow
Attorney, Agent, or Firm—Reising, Ethington, Barnard, Perry & Milton

[57] ABSTRACT

The starting materials for the practice of the present invention are (1) one or more organic monomers or oligomers which upon irradiation very rapidly undergo a polymerization reaction to form a solid polymer; and (2) a liquid vehicle in which the one or more organic monomers or oligomers are soluble but in which the polymer formed is insoluble. For the manufacture of microporous membrane in accordance with the invention the monomers or oligomers are dissolved in the liquid vehicle, the resulting solution is formed into a thin layer, and the thin layer of the solution is then irradiated as with ultraviolet or electron beam radiation whereupon the rapid polymerization reaction immediately ensues and the polymer formed immediately segregates from the vehicle thereby resulting in microporous membrane from which the vehicle can be removed as by evaporation or washing. Because the radiation-induced polymerization reaction and the segregation of the polymer formed are so rapid, the membrane formed has cells and communications therebetween of very small dimensions thereby providing the microporous structure. Where ultraviolet radiation is used the solution also includes a photoinitiator.

7 Claims, No Drawings

METHOD FOR MANUFACTURING MICROPOROUS MEMBRANE

TECHNICAL FIELD

The subject matter of the present invention is a method for manufacturing microporous organic polymeric membrane. By "microporous membrane" is meant a fluid permeable sheet or film having pores with a pore size of from 0.02 to 15 microns and having a thickness of less than 0.1 inches.

BACKGROUND ART

Microporous membrane containing interconnected voids is currently manufactured by using as a starting material a pre-formed organic polymer. As the first step, the polymer is dissolved in a suitable solvent or combination of solvents. After this solution has been filtered and debubbled, it is taken through steps which involve forming a wet film of the polymer solution, contacting this film with a nonsolvent for the polymer and then removing the nonpolymeric components in such a way that the desired final dry microporous membrane properties are obtained. The microporosity results from the phase separation when the polymer chains physically agglomerate to form the walls and the void volume results from those spaces in which the phase-separated solvent remains. At a further stage in the process this solvent is removed by exchange with water and the film is then dried. Through the choice of polymer, solvent and nonsolvent and by carefully controlling the process kinetics of phase separation caused by the diffusive entrance and exit of solvents and nonsolvents to and from the as yet-liquid film of polymer solution, the total void content and average void size (pore size) can be controlled. Since the steps which control pore size and porosity involve diffusion through a partially solidified swollen gel, the residence time required for a given set of conditions is usually in the order of several minutes. Thus the rate of production is at most about thirty linear feet per minute, and involves large machine path lengths of up to one hundred feet. However, the real limitations of the method are much more fundamental, and relate to the problems involved in the solution processing of polymers. To begin with, the method is restricted to polymers which are conveniently soluble in a limited number of water soluble solvent-nonsolvent systems. Since the solution properties and the mechanical properties of the polymer are quite sensitive to the original molecular weight distribution, batch to batch processability is very dependent on the consistency of the raw material. Such consistency can be difficult to attain, when, as is often the case, it is necessary to blend different lots of the polymer to make a given batch. Indeed, in large reactors even the attainment of a truly uniform solution of the polymer, or mixture in a combination of solvents or nonsolvents, can be difficult and time consuming, especially since shear-degradation due to mixing can change the intrinsic polymer properties. Further, the prepared polymer solutions are often prone to phase separation at room temperature. It is frequently a requirement that they be handled and maintained at elevated temperature during further processing, which is a further complication. In short, the current and previously used methods of manufacturing microporous membrane from preformed polymers are troublesome, time consuming, lend themselves only to a low rate of production and hence are expensive.

It is known, and indeed common practice, to manufacture porous polymeric material (foam) using monomers and oligomers as the starting materials and causing the polymerization reaction therebetween to occur simultaneously with the generation of voids. In such cases the void volume is generated from gases added to the formulation or formed during the reaction which lead to the formation of gas bubbles and which cause expansion of the polymerizing liquid. If the bubbles touch one another and sufficient pressure is generated, the walls between the bubbles become thin and collapse creating an "open celled" foam. The most common example of this is the manufacture of open-celled polyurethane. However, the cell size or pore size distribution attained, is very broad and usually far greater than 15 microns.

It is known to produce microporus polypropylene membrane by a process involving the swelling of a polypropylene film in a solvent and thereafter bi-axially stretching the film while in the swollen state. However, this process creates elliptically shaped voids in the membrane, which renders it mechanically fragile, and the total void content cannot be made to exceed about 30%. Hence the method is quite restrictive both as to the polymer used and as to the properties of the membrane formed.

It is also known to manufacture microporous laminate sheets of polytetrafluoroethylene on a backing fabric, such method involving the sintering of the tetrafluoroethylene polymer which is used as the starting material. Here again, however, the method is quite restrictive both as to the polymer which can be used and as to the properties of the final product.

In the art of polymer formation broadly, it is well known that electron beam or ultraviolet irradiation can be used to initiate the rapid polymerization of monomers or oligomers to a solid polymer. Ultraviolet radiation is more commonly used, in which case the starting material must include not just the monomer or oligomer but also a photoinitiator. Such method P-335 is currently in common use for example in the printing, textile, floor covering, and adhesive industries for rapidly forming polymeric coatings. One of the advantages to the method as currently used for forming polymeric coatings is that it does away with the need for conventional solvents. That is, the article on which the polymeric coating is desired can be coated with undiluted oligomer, plus a photoinitiator if required, and then irradiated to provide the polymeric coating. This saves the expense not only of the otherwise required solvent itself but also the expense of safely evaporating or otherwise removing it from the applied coating as required with more conventional coating methods. Such radiation induced polymeric coatings and the numerous monomers and oligomers as well as the photoinitiators and radiation sources which are useful in forming same are well described in existing patents and other literature as exemplified by the following:

Polymer News:
  Vol. 4, No. 4, February 1978 (P. 175);
  Vol. 4, No. 5, April 1978 (P. 239);
  Vol. 4, No. 6, June 1978 (P. 268);
  Vol. 5, No. 1, September 1978 (P. 36);
  Vol. 5, No. 2, November 1978 (P. 53);
  Vol. 5, No. 6, July 1979 (P. 283);
  Vol. 6, No. 6, July 1980 (P. 265);

UV Curing: Science and Technology, Editor S. P. Pappas, Technology Marketing Corp,. 1978.

U.S. Pat. Nos.:
4,039,414 (Aug. 2, 1977) to SCM Corp.
4,048,036 (Sept. 13, 1977) to PPG
4,075,366 (Feb. 21, 1978) to DeSoto
4,148,987 (April 10, 1979) to Rohm and Haas British Pat. No. 932,126 teaches the manufacture of porous ion-exchange resins by subjecting to ultraviolet radiation a mixture of unsaturated monomers dissolved in a liquid which functions as a precipitant for the ion-exchange resin resulting from the polymerization of the monomers.

BRIEF DESCRIPTION OF THE INVENTION

In the practice of the present invention for the manufacture of microporous membrane, a material selected from the group consisting of the organic oligomers and monomers, and mixtures thereof which rapidly polymerize to a solid polymer upon irradiation is dissolved in a liquid vehicle in which the material is soluble but in which the solid polymer to be formed is insoluble, a photoinitiator also being included in the solution if the radiation to be used renders such necessary or desirable. Then, for the manufacturer of membrane, such solution is formed into a thin layer on a support surface and the thin layer of the solution is exposed to electron beam or ultraviolet radiation whereupon the material in the thin layer rapidly, substantially instantaneously, polymerizes to the solid polymer. This resulting polymer, being insoluble in the liquid vehicle, immediately segregates from the vehicle thereby providing a solid continuous network of interconnecting cells. The liquid vehicle can then be removed, as by evaporation or washing, and recycled if desired. Because the polymer formation is so rapid by reason of the radiation and because the polymer formed segregates from the liquid vehicle immediately upon formation by reason of its insolubility in the vehicle, the resulting intercommunicating cells and the communications therebetween are of small dimensions thereby to provide the microporous structure. One of the advantages to the method is that it lends itself to a high rate of production of the membrane on a continuous basis on a translating support surface—this because the radiation-induced polymerization and the segregation of the resulting polymer are so rapid.

As discussed hereinafter, the invention can be used to make microporous bodies other than membrane, in which case the solution need not be formed into a thin layer prior to the irradiation. However, as stated above, the invention lends itself particularly to the manufacture of microporous membrane and hence chief emphasis has and will be placed on this preferred embodiment.

The above and other features and advantages of the invention will appear more clearly from the more detailed description thereof which follows.

BEST MODE FOR CARRYING OUT THE INVENTION

The invention can be practiced using a single or combination of monomers, a single or combination of oligomers, or a combination of one or more monomers and one or more oligomers. However, the one or more monomers or oligomers or the combination thereof used must be such as will rapidly undergo a polymerization reaction under electron beam or ultraviolet radiation to form a solid polymer. Such monomers and oligomers are well known in the radiation-induced polymer coating art, reference here being made, for example, to the above patents and other publications which contain extensive lists of the numerous and diverse monomers and oligomers which can be used. The class of monomers and oligomers most noted for this characteristic of undergoing rapid polymerization under electron beam or ultraviolet radiation are: the addition polymerizable unsaturated organic compoounds having a double bond between two carbon atoms at least one of which also has bonded thereto a carboxyl, carboxylate ester or amido functionality; the epoxies and other cyclic ethers; and the thiolenes. Within these categories some of the main groups are the unsaturated polyester oligomers, the epoxy oligomers and, most particularly, acrylic acid and the monomers and oligomers terminated by an acrylic, acrylate or acrylamide group, a few specific examples of which are: 2-ethyl hexylacrylate, 1-4 butanediolmonoacrylate, isobutoxymethylacrylamide, 1-6 hexanedioldiacrylate, diethylaminoethylacrylate. Other examples can be found in the aforementioned publication Polymer News, Vol 4, No. 5, April 1978, P. 239.

As is also well known, the polymerization reaction mechanism involves the formation of free radicals under the radiation which free radicals propogate and induce the polymerization. The free radical can result either from one or more functionalities of the monomers or oligomers used or, where the monomer or oligomer contains no functionality which forms a free radical under the irradiation used, from a compound which may not itself be polymerizable but which contains one or more functionalities resulting in free radical formation under the irradiation. Such compounds are known as photoinitiators, numerous such photoinitiators of diverse types being well known as indicated, for example, in the listing thereof in the above-mentioned patents and other publications. Some of the photoinitiators in common use for radiation induced polymeric coatings are: benzoin and the benzoin alkyl ethers, benzophenone alone or with an amine; Michler's ketone 4,4'-bis (dimethylamino) benzophenone; the acetophenones such as 2,2 diethoxyacetophenone; the oximes; the diazonitriles; anthraquinone; the carboxylated polynuclear sulfonyl chlorides; the dixanthates, and diphenyl disulfide. In the case of cationic initiated polymerization induced by the radiation the reaction mechanism involves not necessarily a free radical but a cationically charged radical which can likewise be supplied either by the monomer or oligomer or by a photoinitiator.

For the practice of the invention the electron beam or ultraviolet radiation source can be any of those currently used and disclosed in the literature for producing radiation-induced polymeric coatings, for example, those disclosed in the above reference patents and other publications. For economy ultraviolet radiation is generally preferred, the most commonly available ultraviolet radiation sources being mercury vapor lamps though pulsed xenon and plasma arc ultraviolet generators are also known for use where the initiation of the polymerization reaction requires particularly high energy radiation. The choice of the specific mercury vapor lamp or other radiation source used depends on the radiation energy requirement for inducing the polymerization of the particular polymerizable material, plus photoinitiator, if required, to be polymerized.

The choice of vehicle for the practice of the invention will, of course, depend entirely on the choice of the monomer and/or oligomer used, it being mandatory that the vehicle function as a solvent for the monomer and/or oligomer but that the polymer formed be insoluble therein. For most embodiments the practice of the invention requires the use of an organic liquid as the vehicle though it will be understood that an inorganic liquid such as water could be used if the monomer and/or oligomer used is soluble and the polymer formed is insoluble therein. It is of course also necessary that the vehicle function only as such and hence that it be chemically inert relative to the monomer and/or oligomer used. Further it is preferable that it be relatively nonabsorbing toward the radiant energy (either ultraviolet or electron beam), and also that it be substantially chemically stable to the radiant energy so that the polymerization reaction can take place with reasonable efficiency without interference by spurious side reactions with the vehicle. Still further, in order to provide maximum flexibility in the choice of the manner in which the solution of the polymerizable material in the organic vehicle is formed into a thin layer, it is preferable that the liquid vehicle be of low viscosity. Of course the lower the viscosity of the liquid vehicle the lower will be the viscosity of the solution for any given concentration of given polymerizable material therein, and if the solution is of low viscosity it can, for example, be more rapidly formed into a thin layer by simply flowing it onto and over the support surface than would be the case if it were of high viscosity. Where the liquid vehicle is of lower viscosity than required to impart to the solution the precise viscosity desired for the particular method desired to be used for forming it into a thin layer, the viscosity can be adjusted upwardly by the addition of a viscosity modifier or control agent, for example the finely divided silicas, bentonite and the like. Of course any such viscosity modifier should be such that, in the concentration used, it does not interfere with the polymerization reaction as by the absorption of the radiant energy.

Hence, it will be seen that if the liquid vehicle is of low viscosity such that the solution made therewith is of relatively low viscosity, since it is a relatively simple matter to increase the viscosity, there is maximum flexibility in choice of method for forming the solution into a thin layer. However, it is not necessary that the liquid vehicle be of low viscosity since there are methods whereby a high viscosity solution can be readily formed into a thin layer, for example by the use of doctor blades or by roll coating, or by spraying or by the use of other methods where by reason of the high shear rate applied the effective viscosity is reduced.

Because of the essential requirements that the liquid vehicle be a solvent for the polymerizable material but not for the polymer formed and that it be chemically inert and not enter into or interfere with the polymerization reaction, for many if not most polymerizable materials there may be no liquid vehicle available having these characteristics and also having low viscosity, in which case there will be restriction on the methods which can be used for efficiently and rapidly forming the solution into a thin layer for practice of the method of the invention to make microporous membrane. However, this is no serious limitation since, as indicated above, there are many methods available and well known in the art for quickly and efficiently forming liquids of relatively high viscosity into a thin layer.

As indicated above, the viscosity of the solution involves not just the viscosity of the liquid vehicle but also the concentration of the polymerizable material dissolved therein and the concentration of all other materials included, for example photoinitiator and viscosity modifier, whether dissolved or suspended. But the paramount consideration, as regards concentrations, is not viscosity but rather that of attaining a high void volume in the membrane made along with high contiguity and hence intercommuncation between the small voids or cells formed as a result of the rapid formation and immediate segregation of the polymer. The void volume of the membrane made should be at least 15%, and preferably more than 30%, up to 95% of the total volume of the membrane and to this end the concentration of the polymerizable material together with any other nonvehicle ingredients included should be such that the volume fraction of the liquid vehicle be no less than 15%, and preferably greater than 30%, but no greater than 95%. (The volume fraction of a component is obtained by dividing the weight fraction in parts per hundred of each component by its respective density to obtain a component volume, summing all the volumes, and dividing each component volume by the total sum.)

Where the measured void volume of the final polymerized microporous membrane is less than the volume fraction of the vehicle used, such indicates that albeit the polymer is insoluble in the vehicle there has nevertheless been some vehicle retention by the polymer. It is theorized that such vehicle retention may be due to some degree of hydrogen bonding between the vehicle and the polymer. Any extent of vehicle retention is undesirable in that it can result in softening and swelling and even some degree of collapse of the microporous structure resulting in undesired reduction of the void volume. Hence, it is preferred that the vehicle selected be such that there is minimum retention thereof by the polymer. Where this is not possible by reason of the polymer and polymerizable materials used and the other stated required and desired properties for the vehicle, it is especially desirable that vehicle removal from the formed microporous membrane be accomplished by washing rather than just by vehicle evaporation, as will be discussed hereinafter.

Whereas it is possible to practice the invention on a batch basis with a stationary support surface, to gain full advantage of the invention, it is much preferred to practice it on a continuous basis using a translating support surface such as a roll-driven continuous web or belt. Using such apparatus the solution of the monomer and/or oligomer in the vehicle can be made on a continuous basis or it can be made on a large batch basis, and the solution poured or otherwise applied continuously onto the upstream end of the driven continuous belt support surface, the irradiation source being located above the belt downstream of the solution application station and the membrane removal station being further downstream of the belt, the membrane being removed in the form of a continuous sheet thereof. Removal of the vehicle from the membrane can be accomplished either before or after the membrane is taken from the belt. For this embodiment and all others where it is desired to remove the microporous membrane from the support surface, it is, of course, preferable that the support surface be such as to facilitate as much as possible the removal of the membrane therefrom. Typical of the support surfaces useful for the practice of such embodiments are smooth, stainless steel sheet or, better yet, Teflon or Teflon-coated metal sheet. Rather than using a continuous belt, the support surface can be of an expendable material, such as release paper or the like (but not soluble in the vehicle), in the form of a roll thereof such that it can be continuously unrolled from the roll, upstream of the solution application station, as a continuous driven length and then rerolled, with the microporous membrane thereon, downstream of the radiation station.

Embodiments are also recognized in which the microporous material is not to be separated from the solid support, but in which the two bonded together are the desired final product. An example of such an embodiment is polyester film supported microporous sheet which is utilized in electrophoretic separations.

For the purpose of coating of said support surfaces it is necessary for the solution to wet said surface with a very low or zero contact angle. When support surfaces with very low surface energies, e.g. Teflon-coated metal sheet, release paper, etc., are used, it is often necessary to add a small amount, usually in the range of 0.05–0.5% by weight, of a surfactant whose presence reduces the surface energy of the solution of vehicle plus oligomers and/or monomers. Examples of such nonionic surfactants include the polyoxyethylenes, the siloxanes, and the fluorinated surfactants. Ionic surfactants may also be utilized provided that they do not cause macro-phase separation or undue cloudiness of the solution which would cause decreased efficiency because of irradiation absorption.

It is also within the purview of the invention to form the thin layer of solution as a coating on or intermingled and supported by a porous sheet or fibrous web to which the resulting membrane remains bounded and which can function, for example, as a strengthening reinforcement or backing for the microporous membrane. Such porous support surface of which the microporous membrane is formed should, of course, be of a material which is insoluble in the vehicle used. Typical of the porous support surfaces which can be used for the practice of such embodiments are paper, woven and nonwoven fabric, and the like.

For most embodiments wherein microporous membrane is manufactured, it is only necessary to apply the radiation to one side of the thin layer of the solution; however, it is quite feasible to apply the radiation to both sides of the thin layer if such is desired. For example, if the solution is viscous and is applied to a webbing, then the webbing with the solution applied thereto can be translated in a vertical position with radiation sources on both sides thereof. As another example, if the support surface for the solution is sufficiently radiation transparent, then the radiation can be applied not only to the upper surface of the layer of the solution on the support but also to the undersurface, through the support.

After the radiation induced polymerization reaction is complete, resulting in the microporous polymeric structure, it is necessary to remove the vehicle. Though vehicle removal by evaporation is possible, in most cases it is preferred that the vehicle be removed by washing with a low viscosity liquid in which the vehicle is soluble, or at least easily emulsifiable. Of course, it is also necessary that the liquid used for removing the vehicle not be a solvent for the polymer or not itself be retained by the polymer such that it causes swelling or other deterioration of the microporous structure. Most preferred is a washing liquid which is not only a solvent for the vehicle but also for polymerizable material and any photoinitiator used in the initial formulation so that the washing results not only in vehicle removal but also in removal of any such ingredients remaining unreacted at the conclusion of the polymerization reaction. Still further, it is best that the washing liquid be of low boiling point. The washing can be accomplished by running the microporous membrane through a bath of the washing liquid, preferably with periodic squeezing of the membrane as by running it between rollers in the bath. After the membrane emerges from the bath the washing liquid remaining in the membrane can be removed by evaporation. By using a washing liquid of low boiling point the energy requirement for its removal by evaporation is minimized. Also, if the boiling point of the washing liquid is significantly below that of the vehicle, subsequent separation of the vehicle from the washing liquid for recycling is simplified and can be accomplished with relatively low energy requirement. The precise choice of washing liquid will, of course, depend on the polymer and on the vehicle used; however, from the standpoint of low viscosity and boiling point, the low boiling alkanes such as petroleum ether, cyclohexane and hexane and the linear halocarbons such as trichlorotrifluoro ethane are excellent.

EXAMPLES

1. A mixture of 50 gram epoxyacrylate oligomer (Celrad 3700, Celanese Corp.), 1.1 gram mixture of 2-hydroxy-2-methyl-1-phenyl-propane-1-one photoinitiator (Darocur 1116, Merck Company), 0.1 gram of a non-ionic surfactant (FC-431, Minnesota Mining and Manufacturing Company and 51 gram diisobutyladipate as liquid vehicle were mixed to a uniform solution at 60° C., the solution being protected against exposure to ambient light during the mixing. Such solution was then formed into a thin layer on a release paper and run at a speed of 2m/min through a UV processor composed of a Hanovia medium pressure mercury lamp 200 watt-/inch within an eliptic air cooled reflector housed within a light proof shielding unit. The reflector height was kept at a distance 95–100 mm above the release paper. The resulting microporous membrane was removed from the release paper and washed for 1–2 minutes in each of two baths containing petroleum ether (B.P. 60°–80°). The coherent membrane was opaque-white after being air dried. Void volume was measured by weighing a piece of the membrane, soaking for one to two minutes in kerosene and reweighing. The void volume could be calculated from the known weights of the dry membrane and kerosene and from their known respective densities of 1.25 and 0.792 g/cm$^3$. The void volume was about 50%.

2. A mixture of 50 parts (by weight) isobutoxymethylacrylamide monomer and 50 parts acrylic acid monomer with 100 parts ethyllaurate as liquid vehicle and 2 parts (Irgacure 651, Ciba-Geigy Company) as a photoinitiator was processed as in Example 1. The resulting membrane was opaque-white and had a void volume of about 50%.

It will be understood that while the invention has been described in its particulars with respect to preferred embodiments thereof, various changes and modifications made be made all within the full and intended scope of the claims which follow.

What is claimed is:

1. A method for manufacturing fluid permeable microporous membrane comprising:
   A. mixing into a liquid vehicle a material
      (1) which is rapidly polymerizable under ultraviolet or electron beam irradiation to a solid polymer insoluble and non-dispersible in the liquid vehicle such that when the polymer is formed it rapidly segregates from the liquid vehicle, and (2) which is selected from the group consisting of the organic monomers, the organic oligomers and mixtures thereof which are soluble in the liquid vehicle whereby upon said mixing there results a composition which is a liquid solution of said material in said liquid vehicle, said liquid vehicle being chemically inert relative to said material;

B. forming said composition into a thin liquid layer;

C. exposing said thin liquid layer of the composition to ultraviolet or electron beam irradiation whereby said material rapidly polymerizes to said solid polymer which rapidly segregates from the liquid vehicle thereby to form a membrane having a solid continuous network of intercommunicating cells; and D. removing said liquid vehicle from the membrane.

2. A method as set forth in claim 1 wherein said composition contains said liquid vehicle in an amount of from 30% to 95% by volume.

3. A method as set forth in claim 1 wherein said composition also contains a photoinitiator and wherein the radiation to which the composition is exposed is ultraviolet radiation.

4. A method as set forth in claim 1 wherein said composition is formed into a thin layer by spreading it onto a support surface.

5. A method as set forth in claim 4 wherein the membrane formed is separated from said support surface.

6. A method as set forth in claim 4 wherein the support surface is a sheet of material to which the membrane bonds and wherein the membrane remains bonded to said sheet.

7. A method as set forth in claim 1 wherein said liquid vehicle is removed from said membrane by washing the membrane with a low viscosity liquid in which the liquid vehicle is soluble or emulsifiable.

* * * * *